(12) United States Patent
Aksit et al.

(10) Patent No.: US 6,659,472 B2
(45) Date of Patent: Dec. 9, 2003

(54) SEAL FOR GAS TURBINE NOZZLE AND SHROUD INTERFACE

(75) Inventors: Mahmut Faruk Aksit, Istanbul (TR); Ahmad Safi, Troy, NY (US); Abdul-Azeez Mohammed-Fakir, Schenectady, NY (US); Srikanth Vedantam, Niskayuna, NY (US); Ning Fang, West Chester, OH (US); Gayle Hobbs Goetze, Greenville, SC (US); Brian Peter Arness, Simpsonville, SC (US); John Ellington Greene, Simpsonville, SC (US); Wei-Ming Chi, Fremont, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,928

(22) Filed: Dec. 28, 2001

(65) Prior Publication Data

US 2003/0122325 A1 Jul. 3, 2003

(51) Int. Cl.[7] ................................ F16J 15/02
(52) U.S. Cl. .................. 277/647; 277/652; 277/654
(58) Field of Search ................. 277/644, 647, 277/650, 652–4; 415/189, 191, 209.2, 174.2, 174.3

(56) References Cited

U.S. PATENT DOCUMENTS

| | | | | |
|---|---|---|---|---|
| 3,893,786 A | * | 7/1975 | Rahnke et al. ............ | 415/178 |
| 3,999,883 A | | 12/1976 | Nordenson | |
| 4,184,689 A | | 1/1980 | Brodell et al. | |
| 4,199,151 A | * | 4/1980 | Bartos ...................... | 277/306 |
| 4,336,943 A | * | 6/1982 | Chaplin .................... | 277/643 |
| 4,477,086 A | * | 10/1984 | Feder et al. .............. | 277/632 |
| 4,752,184 A | * | 6/1988 | Liang ....................... | 415/116 |
| 4,815,933 A | | 3/1989 | Hansel et al. | |
| 4,897,021 A | | 1/1990 | Chaplin et al. | |
| 5,092,735 A | * | 3/1992 | Katy et al. ................ | 415/115 |
| 5,149,250 A | * | 9/1992 | Plemmons et al. ...... | 415/209.3 |
| 5,158,305 A | * | 10/1992 | Halling .................... | 277/591 |
| 5,271,714 A | | 12/1993 | Shepherd et al. | |
| 5,273,396 A | * | 12/1993 | Albrecht et al. ......... | 415/173.1 |
| 5,343,694 A | * | 9/1994 | Toborg et al. ............ | 60/796 |
| 5,372,476 A | | 12/1994 | Hemmelgarn et al. | |
| 5,716,052 A | * | 2/1998 | Swensen et al. ......... | 277/647 |
| 5,807,072 A | | 9/1998 | Payling | |
| 5,819,854 A | * | 10/1998 | Doane et al. ............ | 166/373 |
| 6,095,750 A | | 8/2000 | Ross et al. | |
| 6,164,656 A | * | 12/2000 | Frost ........................ | 277/312 |
| 6,237,921 B1 | * | 5/2001 | Liotta et al. ............. | 277/630 |
| 6,287,091 B1 | | 9/2001 | Svihla et al. | |
| 6,402,466 B1 | | 6/2002 | Burdgick et al. | |

FOREIGN PATENT DOCUMENTS

DE 38 39 843 A1 5/1990

* cited by examiner

*Primary Examiner*—Anthony Knight
*Assistant Examiner*—Alison K. Pickard
(74) *Attorney, Agent, or Firm*—Nixon & Vanderhye

(57) ABSTRACT

In a gas turbine including a nozzle retaining ring having a first annular axially sealing surface and a shroud segment having an axial registering second surface. To minimize or prevent leakage flow between the retaining ring and shroud segments, a generally U-shaped seal having reversely folded U-shaped marginal portions is received in a cavity formed in the second surface. At operating conditions, the marginal portions seal against the base of the cavity and the first surface of the retaining ring to prevent leakage flow past the retaining ring/shroud segment interface. To install the seal, the seal body is first compressed and maintained in a compressed state by applying one or more wraps about the seal body and an epoxy is used to secure the seal when compressed in the cavity. At operating temperatures, the retention means releases the seal to engage marginal portions against opposite sealing surfaces of the shroud segments and retaining ring.

16 Claims, 4 Drawing Sheets

SEAL FOR GAS TURBINE NOZZLE AND SHROUD INTERFACE

BACKGROUND OF THE INVENTION

The present invention relates to seals in turbines and particularly relates to seals for substantially minimizing or eliminating leakage losses between a turbine nozzle retaining ring and shroud segments.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

During operation and/or repair of the first-stage nozzle, it has been found that warpage can leave gaps between the sealing surfaces of the nozzle retaining ring and the shroud segments. These gaps enable leakage between those axially confronting surfaces. Typically, the confronting faces of the nozzle retaining ring and the shroud segments are provided with W-seals to prevent leakage. However, the W-seals can be jammed during assembly and may crack during operation due to low cycle fatigue. Consequently, there is a need for a new seal which will tolerate the warpage of the various parts of the first stage of the turbine resulting in leakage paths between the nozzle retaining ring and shroud segments, eliminate that leakage and improve the robustness of the seal at that location.

BRIEF DESCRIPTION OF THE INVENTION

In accordance with a preferred embodiment of the present invention, there is provided a seal between the nozzle retaining ring and the shroud segments, preferably for the first stage of the turbine which eliminates or minimizes leakage past the confronting surfaces of the retaining ring and shroud segments. The seal includes a seal body which extends in an arcuate cavity in one of the axially opposed sealing surfaces of the nozzle retaining ring and shroud segments radially outwardly of the hot gas path. The seal body has preferably a first, generally U-shaped portion in cross-section, and a pair of reversely extending, generally U-shaped marginal portions in cross-section along opposite sides of the U-shaped portion. With the seal body disposed in the cavity and at turbine operating conditions, the marginal portions of the seal body lie in sealing engagement against an interior surface of the cavity, e.g., the base of the cavity, and the opposite opposed axially facing sealing surface whereby any gap otherwise affording leakage flow past these confronting axially facing surfaces is substantially eliminated.

In a particular preferred form of the present invention, the seal is formed of sheet metal, preferably a pair of complementary-shaped sheet metal plates secured, for example, by welding, to one another and bent into the aforementioned cross-sectional configuration. To install the seal, the seal is first placed in a compressed state and maintained in that compressed state during installation. To accomplish this, the seal may be wrapped by a material which, at turbine operating or near-operating conditions such as temperature, disintegrates, releasing the seal to expand in the cavity which, under preload, biases the marginal portions of the seal body against the sealing surfaces. The wrap may be formed of a Kevlar® 29 or may be formed of a high-strength plastic material, such as Lexan™ or Ultem™ clips to hold the seal in a compressed condition during installation. Alternatively, epoxy may be applied to the compressed seal to maintain the seal in the cavity in the compressed condition, the epoxy releasing the seal body at operating or near-operating turbine conditions for sealing engagement with the opposed sealing surfaces.

In a preferred embodiment according to the present invention, there is provided a gas turbine comprising a turbine nozzle retaining ring having a generally axially facing first surface, a shroud segment having a second surface in axial opposition to the first surface, one of the first and second surfaces defining a cavity opening generally axially toward another of the first and second surfaces and a flexible seal in the cavity including a seal body having a first, generally U-shaped portion in cross-section and a pair of reversely extending, generally U-shaped marginal portions in cross-section along opposite sides of the U-shaped portion, the marginal portions in sealing engagement with an interior surface of the cavity in one surface and another of the first and second surfaces, respectively.

In a further preferred embodiment according to the present invention, there is provided a turbine comprising a turbine nozzle retaining ring having a generally axially facing first surface, a plurality of turbine shroud segments having an annular second surface in axial opposition to the first surface, one of the first and second surfaces having a cavity opening generally axially toward another of the first and second surfaces and at a location radially outwardly of the first seal and a flexible seal in the cavity including a seal body having a first, generally U-shaped portion in cross-section and a pair of reversely extending, generally. U-shaped marginal portions in cross-section along opposite sides of the U-shaped portion, the marginal portions in sealing engagement with an interior surface of the cavity of one surface and another of the first arid second surfaces, respectively.

DETAILED DESCRIPTION OF THE INVENTION

Figure 1:
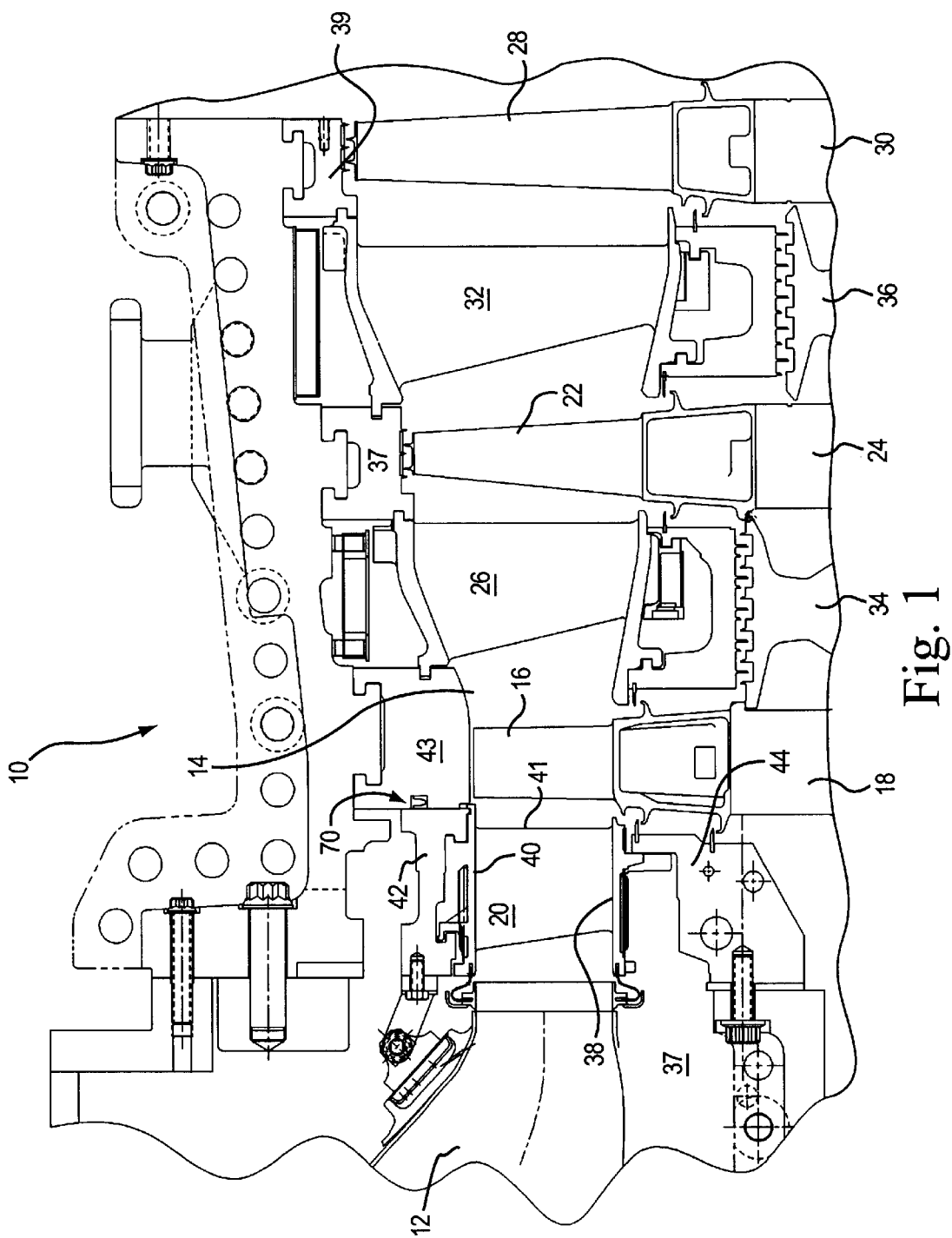
FIG. 1 is a fragmentary schematic side elevational view of a portion of a gas turbine illustrating the location of a seal constructed in accordance with a preferred embodiment hereof.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41, each mounting one, preferably two, stator vanes extending between inner and outer band portions and arranged in an annular array of segments. A nozzle retaining ring 42 connected to the turbine casing is coupled to the outer band and secures the first-stage nozzle. Shroud segments 43 arranged in an annular array thereof surround the rotatable buckets, e.g., the buckets 16 of the first stage. The shroud segments include an axial facing surface 46 (FIG. 2) which lies in sealing engagement with a confronting axial facing surface 48 of the nozzle retaining ring 42. A nozzle support ring 44 radially inwardly of the inner band 38 of the first-stage nozzles engages the inner band 38.

Figure 3:
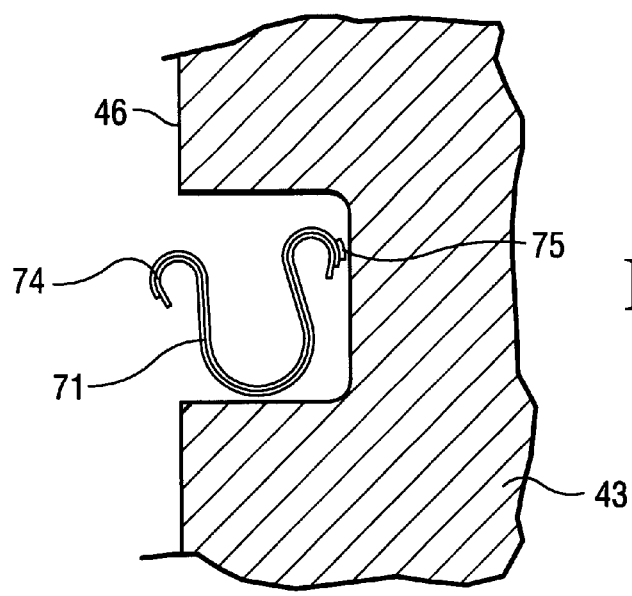
FIGS. 3 and 4 are schematic illustrations of the seal hereof in an uncompressed state which would inhibit or preclude installation of the seal in that state.
Figure 4:
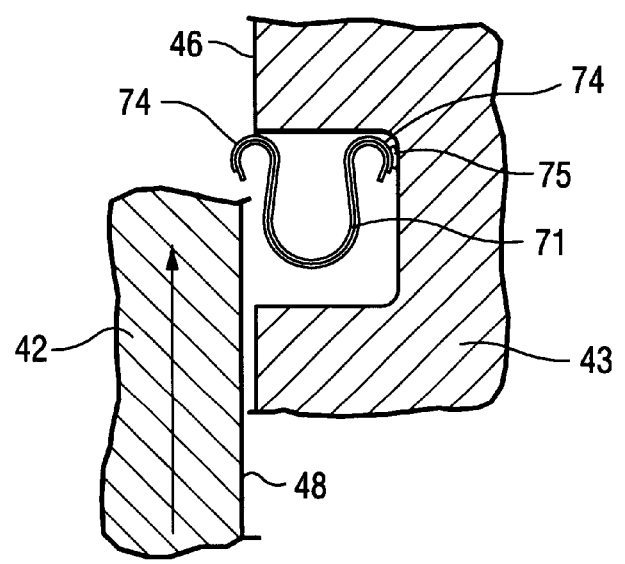
Figure 5:
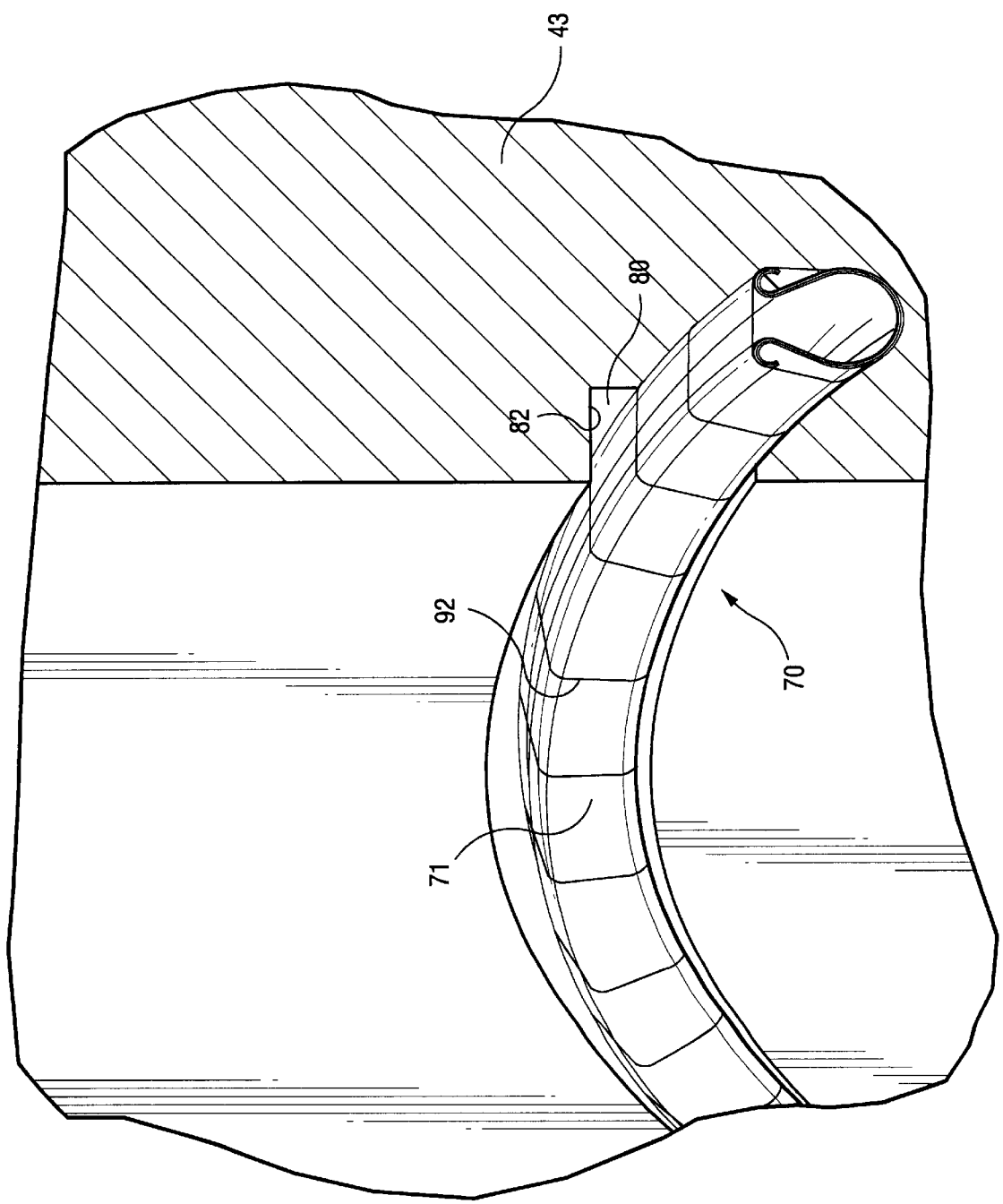
FIG. 5 is a fragmentary perspective view of the seal hereof in a compressed condition prior to and during installation of the seal into the turbine.

As noted previously, however, in turbine operation, the nozzle retaining ring 42 and the shroud segments 43 will tend to form leakage gaps between the axially confronting sealing surfaces 46 and 48 whereby leakage flow may occur across such gaps from the high pressure region to the low pressure region. In order to minimize or prevent such leakage flow into the hot gas path 14, and in accordance with a preferred embodiment of the present invention, there is provided a seal for sealing between the nozzle retaining ring and the shroud segments 43. The seal, generally designated 70 (FIG. 2), includes a seal body 71 having a first, generally U-shaped portion 72 in cross-section and a pair of reversely extending, generally U-shaped marginal portions 74 in cross-section along opposite sides of the U-shaped portion 72. In a natural state of the seal body as illustrated in FIGS. 3 and 4, the laterally outer extremities of the marginal U-shaped portions 74 extend outwardly beyond the lateral extent of the main U-shaped portion 72. Preferably, the seal body 71 is formed of sheet metal. In a particular embodiment hereof, a pair of sheet metal plates 76 and 78 are secured, for example, by welding to one another to form the seal body 71.

Figure 2:
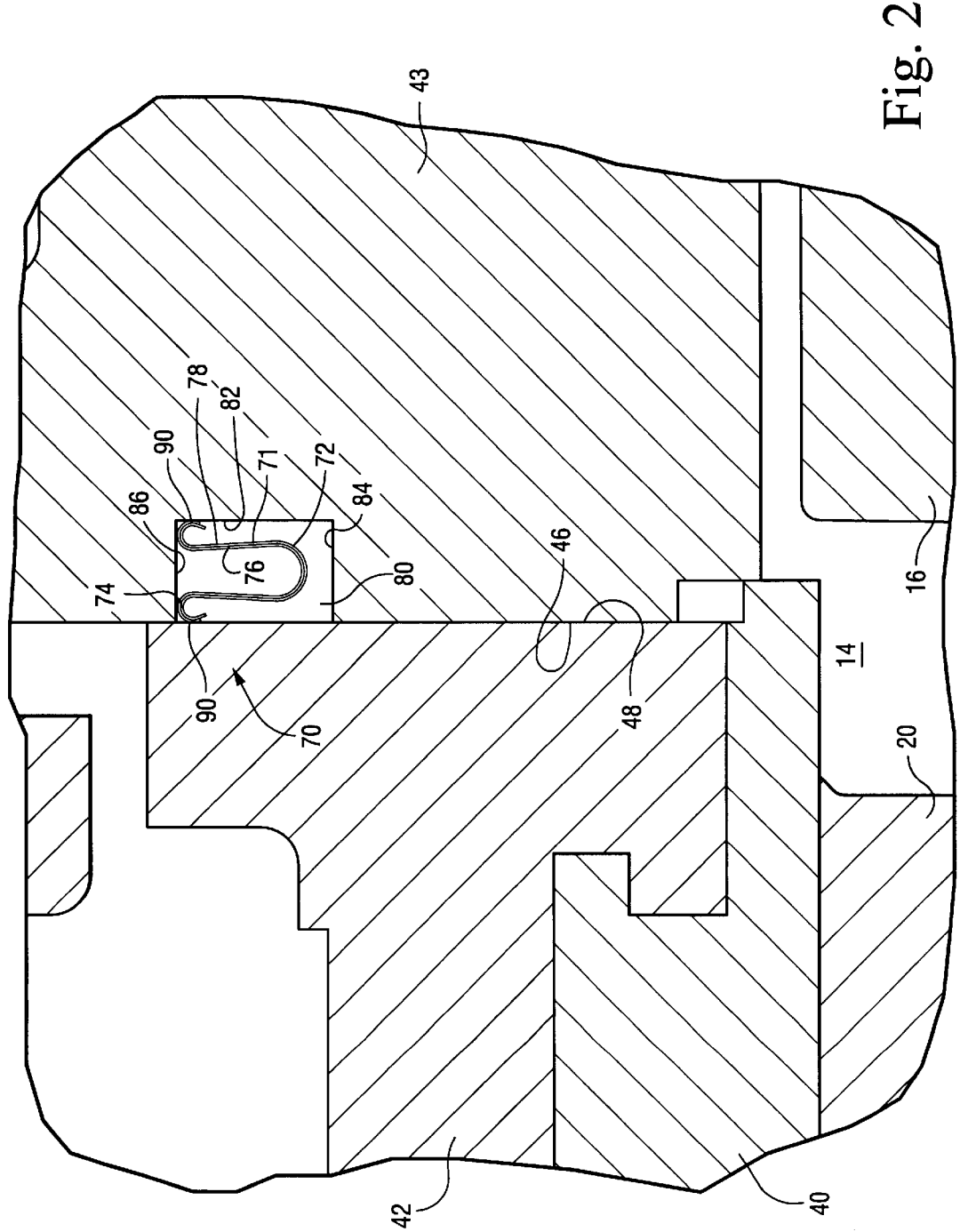
FIG. 2 is an enlarged cross-sectional view illustrating the seal in position sealing between the nozzle retaining ring and the shroud segments of the first stage of a gas turbine.

Still referring to FIG. 2, one of the sealing surfaces 46 and 48 of the shroud segments 43 and the nozzle retaining ring 44 is provided with a cavity 80 for housing the supplemental seal 70. Preferably, the cavity 80 is formed in the shroud segments 43 with the cavity 80 opening generally axially toward the axially opposite sealing surface 48 of the nozzle retaining ring 44. The cavity 80 includes a base 82 and radially opposed surfaces 84 and 86, respectively. The cavity 80 extends in an arcuate path about the axis of the turbine rotor and lies radially outwardly of the hot gas path 14. Consequently, the seal 70 is located to substantially preclude any leakage flow past the axially opposed surfaces 46 and 48 from entering the low pressure region of the hot gas path 14.

Because the marginal sealing portions 74 are biased or preloaded for sealing engagement against the respective base surface 82 and the sealing surface 48 in use, the seal 70 must first be compressed during installation. Otherwise, and with references to FIGS. 3 and 4, a marginal portion 74 will project from the cavity 80 when the seal body 71 is initially placed in the cavity. It will be appreciated that the projecting marginal portion 74 may snag on the retaining ring or snap off entirely upon mating surfaces 46 and 48, as illustrated in FIG. 4. This, of course, would render the seal ineffective.

To install the seal 70 and render the seal effective, the arcuate cavity 80 is first formed in the surface 46 of the shroud segments 43. The seal 70 is provided preferably in arcuate lengths in excess of the arcuate length of the individual shroud segments, preferably in 90° or 180° lengths, and therefore spans the joints between the shroud segments. To install the seal body, the body is first compressed to a configuration which, when inserted into the cavity 80, enables the seal body to lie wholly within the confines of the cavity 80. Means are provided to maintain the seal body in a compressed state during installation. Such means, for example, may comprise a wrap 92 provided about the entire length or portions of the length of each seal section which flexes the marginal portions 74 of the seal toward one another, reducing both the lateral extent of the marginal seals, as well as the lateral extent of the generally U-shaped portion 72 of the seal. Such wrap may be comprised of Kevlar® 29 and may comprise a continuous wrap or a segmented wrap about sections of the seal. Alternatively, a high-strength plastic such as Lexan™ or Ultem™ clips may hold the seal in a compressed state during assembly. As a further alternative, epoxy 75 may be applied to the margins 74 of the seal when located in the cavity to maintain the supplemental seal in the compressed state.

As the turbine reaches operating conditions, i.e., higher temperatures, the retaining means, e.g., the wrap or wraps or the epoxy, release the seal from its compressed state, enabling the seal to expand in a lateral (axial) direction. Such expansion locates surface portions 90 (FIG. 2) of the marginal portions 74 into engagement against the base 82 of the cavity 80 and the sealing surface 48 of the nozzle retaining ring 42. Consequently, the marginal portions 74 of the seal remain biased or preloaded into sealing engagement with the opposed sealing surfaces notwithstanding relative movement of the surfaces 46 and 48 or the opening of one or more gaps therebetween. It will be appreciated that a metal-to-metal line contact with good sealing performance is thus provided to prevent any leakage flow past the confronting axial surfaces 46 and 48.

As noted previously, the seal 70 is preferably provided in 90° or 180° segments which have a circumferential extent greater than the circumferential extent of the shroud segments. Thus, the seal spans between the joints between adjacent shroud segments. Thus, seal 70 seals against any leakage path at the joints between the shroud segments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine comprising:
   a turbine nozzle retaining ring having a generally axially facing first surface;
   a shroud segment having a second surface in axial opposition to said first surface;
   one of said first and second surfaces defining a cavity opening generally axially toward another of said first and second surfaces;
   a flexible seal in said cavity including a seal body having a first, generally U-shaped portion in cross-section and a pair of reversely extending, generally U-shaped marginal portions in cross-section along opposite sides of said U-shaped portion, said marginal portions in sealing engagement with an interior surface of the cavity in said one surface and said another of said first and second surfaces, respectively; and
   means for releasably retaining said seal body in said cavity in a compressed state such that said seal body lies wholly within said cavity, said retaining means enabling release of said seal body from said compressed state in response to turbine operating conditions.

2. A gas turbine according to claim 1 wherein said cavity and said seal body are arcuate in a circumferential direction about an axis of the turbine.

3. A gas turbine according to claim 1 wherein said seal body comprises sheet metal.

4. A gas turbine according to claim 1 wherein said seal body comprises a pair of sheet metal plates secured one to the other.

5. A gas turbine according to claim 1 wherein said seal body is biased to maintain said marginal portions in sealing engagement with said interior cavity surface and said another of said first and second surfaces, respectively.

6. A gas turbine according to claim 1 wherein said seal body comprises a pair of sheet metal plates secured one to the other, said seal body being biased to maintain said marginal portions in sealing engagement with said interior cavity surface and said another of said first and second surfaces.

7. A gas turbine according to claim 1 wherein said retaining means includes a wrap about said seal body.

8. A gas turbine according to claim 1 wherein said retaining means includes an epoxy temporarily maintaining said seal body in said cavity in said compressed state.

9. A gas turbine comprising:
   a turbine nozzle retaining ring having a generally axially facing first surface;
   a plurality of turbine shroud segments having an annular second surface in axial opposition to said first surface;
   one of said first and second surfaces having a cavity opening generally axially toward another of said first and second surfaces;
   a flexible seal in said cavity including a seal body having a first, generally U-shaped portion in cross-section and a pair of reversely extending, generally U-shaped marginal portions in cross-section along opposite sides of said U-shaped portion, said marginal portions in sealing engagement with an interior surface of the cavity of said one surface and said another of said first and second surfaces, respectively; and
   means for releasably retaining said seal body in said cavity in a compressed state such that said seal body lies wholly within said cavity, said retaining means releasing said seal body from said compressed state in response to turbine operating conditions.

10. A gas turbine according to claim 9 wherein said cavity and said seal body are arcuate in a circumferential direction about an axis of the turbine.

11. A gas turbine according to claim 9 wherein said seal body comprises sheet metal.

12. A gas turbine according to claim 9 wherein said seal body comprises a pair of sheet metal plates secured one to the other.

13. A gas turbine according to claim 9 wherein said seal body is biased to maintain said marginal portions in sealing engagement with said interior cavity surface and said another of said first and second surfaces, respectively.

14. A gas turbine according to claim 9 wherein said seal body comprises a pair of sheet metal plates secured one to the other, said seal body being biased to maintain said marginal portions in sealing engagement with said interior cavity surface and said another of said first and second surfaces.

15. A gas turbine according to claim 9 wherein said retaining means includes a wrap about said seal body.

16. A gas turbine according to claim 9 wherein said retaining means includes an epoxy temporarily maintaining said seal body in said cavity in said compressed state.

* * * * *

UNITED STATES PATENT AND TRADEMARK OFFICE
CERTIFICATE OF CORRECTION

PATENT NO.   : 6,659,472 B2
DATED        : December 9, 2003
INVENTOR(S)  : Aksit et al.

It is certified that error appears in the above-identified patent and that said Letters Patent is hereby corrected as shown below:

Column 2,
Line 44, delete "arid" and insert -- and --.

Signed and Sealed this

Twenty-fourth Day of February, 2004

JON W. DUDAS
*Acting Director of the United States Patent and Trademark Office*